(12) United States Patent
Carolan et al.

(10) Patent No.: US 7,513,932 B2
(45) Date of Patent: Apr. 7, 2009

(54) PLANAR CERAMIC MEMBRANE ASSEMBLY AND OXIDATION REACTOR SYSTEM

(75) Inventors: Michael Francis Carolan, Allentown, PA (US); Paul Nigel Dyer, Allentown, PA (US); Kathryn Beverly Dyer, legal representative, Allentown, PA (US); Merrill Anderson Wilson, West Jordan, UT (US); Ted R. Ohrn, Alliance, OH (US); Kurt E. Kneidel, Alliance, OH (US); David Peterson, Uniontown, OH (US); Christopher M. Chen, Allentown, PA (US); Keith Gerard Rackers, Louisville, OH (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/843,009

(22) Filed: Aug. 22, 2007

(65) Prior Publication Data

US 2008/0085236 A1 Apr. 10, 2008

Related U.S. Application Data

(62) Division of application No. 10/394,620, filed on Mar. 21, 2003, now Pat. No. 7,279,027.

(51) Int. Cl.
*B01D 53/22* (2006.01)
(52) U.S. Cl. .............................. 95/54; 96/4; 96/7; 96/11; 423/418.2; 423/437.1; 423/580.1; 423/644; 585/648; 585/654
(58) Field of Classification Search ............... 95/45, 95/54; 96/4, 7, 11; 423/418.2, 437.1, 580.1, 423/644; 210/321.6, 321.64, 321.84, 510.25; 264/129, 131, 133, 138, 154; 427/126.3, 427/180, 202, 243, 245; 428/688, 689, 699
See application file for complete search history.

(56) References Cited

U.S. PATENT DOCUMENTS 4,791,079 A 12/1988 Hazbun (Continued)

FOREIGN PATENT DOCUMENTS

JP 6-157004 A 6/1994

(Continued)

*Primary Examiner*—Jason M Greene
(74) *Attorney, Agent, or Firm*—Keith D. Gourley; Jiyun Xu

(57) ABSTRACT

Planar ceramic membrane assembly comprising a dense layer of mixed-conducting multi-component metal oxide material, wherein the dense layer has a first side and a second side, a porous layer of mixed-conducting multi-component metal oxide material in contact with the first side of the dense layer, and a ceramic channeled support layer in contact with the second side of the dense layer. The planar ceramic membrane assembly can be used in a ceramic wafer assembly comprising a planar ceramic channeled support layer having a first side and a second side; a first dense layer of mixed-conducting multi-component metal oxide material having an inner side and an outer side, wherein the inner side is in contact with the first side of the ceramic channeled support layer; a first outer support layer comprising porous mixed-conducting multi-component metal oxide material and having an inner side and an outer side, wherein the inner side is in contact with the outer side of the first dense layer; a second dense layer of mixed-conducting multi-component metal oxide material having an inner side and an outer side, wherein the inner side is in contact with the second side of the ceramic channeled support layer; and a second outer support layer comprising porous mixed-conducting multi-component metal oxide material and having an inner side and an outer side, wherein the inner side is in contact with the outer side of the second dense layer.

6 Claims, 11 Drawing Sheets

U.S. PATENT DOCUMENTS

| | | |
|---|---|---|
| 5,240,480 A | 8/1993 | Thorogood et al. |
| 5,306,411 A | 4/1994 | Mazanec et al. |
| 5,356,728 A | 10/1994 | Balachandran et al. |
| 5,534,471 A * | 7/1996 | Carolan et al. ............ 95/54 |
| 5,569,633 A | 10/1996 | Carolan et al. |
| 5,681,373 A | 10/1997 | Taylor et al. |
| 5,788,748 A | 8/1998 | Mazanec et al. |
| 5,846,641 A | 12/1998 | Abeles et al. |
| 5,902,379 A | 5/1999 | Phillips et al. |
| 5,938,822 A | 8/1999 | Chen et al. |
| 6,056,807 A | 5/2000 | Carolan et al. |
| 6,368,383 B1 * | 4/2002 | Virkar et al. ............ 95/54 |
| 6,492,290 B1 | 12/2002 | Dyer et al. |
| 6,541,676 B1 | 4/2003 | Franz et al. |
| 6,786,952 B1 | 9/2004 | Risdal et al. |
| 7,151,067 B2 | 12/2006 | Sakon et al. |

FOREIGN PATENT DOCUMENTS

| | | |
|---|---|---|
| JP | 2001-518045 A | 10/2001 |
| JP | 2003-225567 A | 8/2003 |
| WO | 0193987 | 12/2001 |
| WO | 02/16015 A1 | 2/2002 |

\* cited by examiner

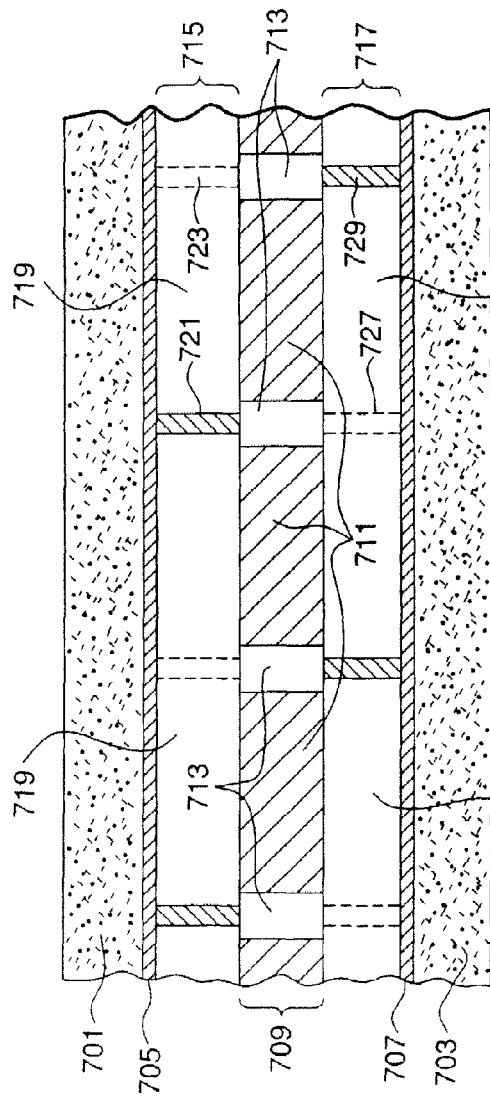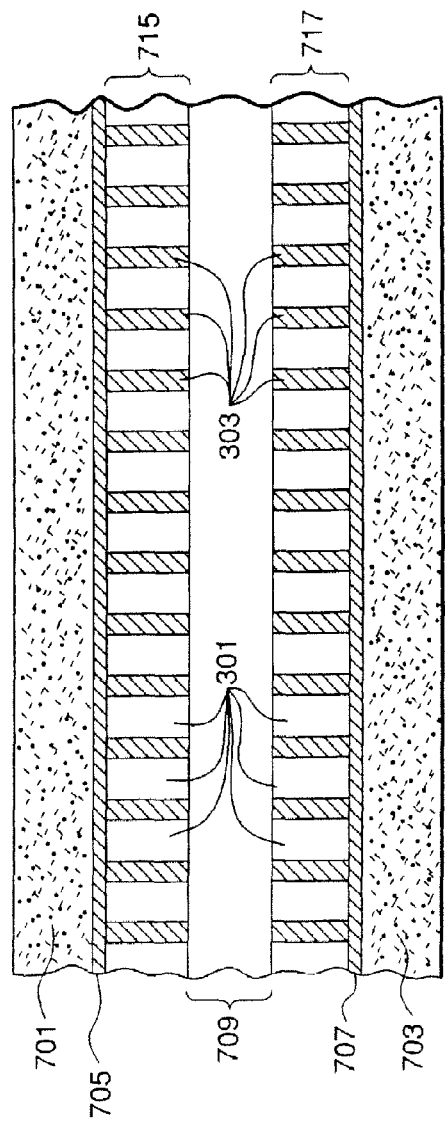
FIG. 7A
FIG. 7B

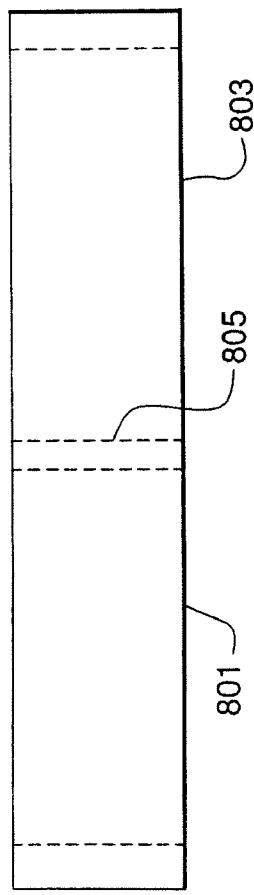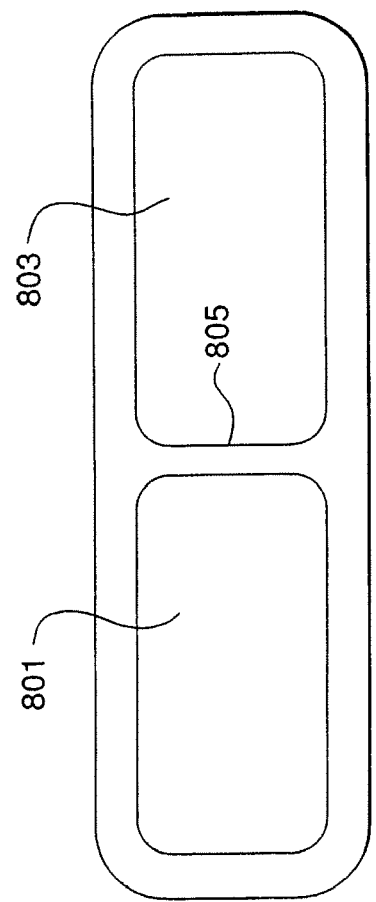

PLANAR CERAMIC MEMBRANE ASSEMBLY AND OXIDATION REACTOR SYSTEM

CROSS REFERENCE TO RELATED APPLICATIONS

This is a divisional of application Ser. No. 10/394,620, filed on Mar. 21, 2003, issued as U.S. Pat. No. 7,279,027 B2 on 9 Oct. 2007, the specification and claims which are incorporated by reference and made a part of this application.

STATEMENT REGARDING FEDERALLY SPONSORED RESEARCH OR DEVELOPMENT

This invention was made with Government support under Contract No. DE-FC26-97FT96052 between Air Products and Chemicals, Inc. and the U.S. Department of Energy. The Government has certain rights to this invention.

BACKGROUND OF THE INVENTION

Oxygen can be separated from oxygen-containing gases by mixed-conducting ceramic membranes operating at high temperatures wherein the membranes conduct both oxygen ions and electrons. Oxygen gas is produced on the permeate side of the membrane and can be recovered as a high-purity product. Alternatively, the permeated oxygen can be reacted directly with a hydrocarbon-containing gas, either catalytically or non-catalytically, to yield a hydrocarbon oxidation product. Various oxygen-containing gases, such as air, can be used and numerous alternative hydrocarbon oxidation products are possible depending on the operating conditions and catalyst if used.

There is a significant and growing commercial interest in the production of synthesis gas from natural gas and air using mixed-conducting ceramic membrane reactor systems. This technology is presently in the development stage and commercial applications are envisioned in future years as the technology matures. Mixed-conducting ceramic membrane reactor systems produce synthesis gas by the partial oxidation of methane to form the synthesis gas components CO, $H_2$, $CO_2$, and $H_2O$. The process is carried out by introducing a methane-containing feed gas and an air feed gas into the membrane reactor system, contacting one surface of the membrane with methane, and contacting the other surface with air. Oxygen permeates through the membrane, methane reacts with permeated oxygen to form a methane/synthesis gas mixture, and methane is further converted into synthesis gas as the mixture travels through the reactor while reacting with additional permeated oxygen.

This process can be integrated favorably with upstream and downstream processes if the methane/synthesis gas stream is at a high pressure, typically 250-450 psig. In addition, process economics are most favorable if the air is at a low pressure, typically less than 50 psig. Therefore, the membranes in the membrane reactor system must be designed to withstand a significant pressure differential between the air side and the methane/synthesis gas side. To achieve high oxygen fluxes through the membrane, the active separating layer of the membrane should be thin, typically less than 200 microns. However, a freestanding membrane of this thickness could not withstand a typical pressure differential of 200-400 psid, and the thin separating layer therefore must be structurally supported in some fashion.

Various designs for ceramic oxygen-conducting membrane systems capable of withstanding high pressure differentials have been described in the art. For example, a tubular ceramic membrane can be subjected to high pressure methane on one side and low pressure air on the other side, but such a membrane must have a sufficiently thick wall to withstand the pressure differential; as a consequence, this membrane cannot achieve a high oxygen flux. To address this problem, composite tubular membranes have been developed which incorporate a thin, dense oxygen-permeating layer on a thicker porous support.

Flat plate membrane configurations have been described in the art wherein the active separating layer is supported by a porous layer or layers on the low pressure side of the membrane, which typically is the permeate side of the membrane. These membrane systems typically are designed to produce a pure oxygen product on the permeate side. If these membranes are used with low pressure air on the low pressure side of the membrane, the porous support layers on the low pressure side of the membrane introduce a gas phase diffusional resistance for transport of oxygen from the oxidant or air to the surface of the dense separating layer. Porous layers that are thick enough to provide support for the thin active separating layer introduce diffusional resistance to the transport of oxygen to the membrane surface, and this resistance will decrease the oxygen flux through the membrane. A need exists, therefore, for composite membrane designs that use a thin active membrane under a high pressure differential without unacceptably high gas phase diffusional resistance on the oxidant side of the membrane.

Porous materials have lower mechanical strength than dense materials. Membrane designs that use porous supports on the low pressure side of a membrane subject the porous support to a compressive stress. This stress may exceed the crush strength of the porous support layer if the differential pressure is high enough, causing the support layer to fail and the thin active layer to leak or fail. The strength of a porous layer is a function of the porosity of the layer material—a lower porosity material is generally stronger than a higher porosity material. Unfortunately, a stronger material with a lower porosity is less permeable than a weaker material with a higher porosity, and increasing the strength of a porous support layer thus increases the gas phase diffusional resistance of the layer. This tradeoff between strength and permeability in porous support materials makes it difficult to design composite membranes that can withstand high pressure differentials and the resulting high compressive stresses. Thus there is a need for membrane designs that avoid placing porous layers under high compressive stresses.

Oxygen transport through a dense oxygen-conducting ceramic membrane is thermally activated. This means that the oxygen flux through the membrane increases exponentially with temperature in the absence of any other mass transfer resistances. When a dense oxygen-conducting membrane is used in a membrane reactor system to conduct an exothermic reaction such as hydrocarbon oxidation, the thermally activated oxygen transport can lead to local hot spots on the membrane. A thin spot on the membrane will experience a higher oxygen flux relative to thicker surrounding regions on the membrane, and the membrane will heat up at this thin spot relative to its surroundings as the oxidation rate increases. This will increase the flux further, thereby further increasing the temperature at that spot. These local temperature gradients generate undesirable thermal stresses that are detrimental to the mechanical integrity of the membrane.

There is a need in the ceramic membrane reactor field for a membrane design capable of withstanding high pressure differentials while also preventing local hot spots from occurring. In particular, there is a need for a hydrocarbon partial oxidation reactor membrane design that will allow the use of a thin oxygen-permeable membrane layer operating under a large pressure differential without developing hot spots caused by localized high oxygen diffusion and high exothermic oxidation rates. This need is addressed by the present invention as described below and defined by the claims that follow.

BRIEF SUMMARY OF THE INVENTION

One embodiment of the invention relates to a planar ceramic membrane assembly comprising a dense layer of mixed-conducting multi-component metal oxide material, wherein the dense layer has a first side and a second side, a porous layer of mixed-conducting multi-component metal oxide material in contact with the first side of the dense layer, and a ceramic channeled support layer in contact with the second side of the dense layer. The dense layer and the porous layer may be formed of multi-component metal oxide material with the same composition. The dense layer, the channeled support layer, and the porous layer may be formed of multi-component metal oxide material with the same composition.

In the planar ceramic membrane assembly, the mixed-conducting multi-component metal oxide material may comprise one or more components having the general composition $(La_xCa_{1-x})_yFeO_{3-\delta}$ wherein $1.0>x>0.5$, $1.1\geq y>1.0$, and $\delta$ is a number which renders the composition of matter charge neutral. The porous layer may have a porosity between about 10% and about 40% and a tortuosity between about 3 and about 10.

The porous layer may comprise one or more catalysts that include metals selected from or compounds containing metals selected from the group consisting of platinum, palladium, rhodium, ruthenium, iridium, gold, nickel, cobalt, copper, potassium and mixtures thereof.

Another embodiment of the invention includes a planar ceramic wafer assembly comprising
  (a) a planar ceramic channeled support layer having a first side and a second side;
  (b) a first dense layer of mixed-conducting multi-component metal oxide material having an inner side and an outer side, wherein portions of the inner side are in contact with the first side of the ceramic channeled support layer;
  (c) a first outer support layer comprising porous mixed-conducting multi-component metal oxide material and having an inner side and an outer side, wherein the inner side is in contact with the outer side of the first dense layer,
  (d) a second dense layer of mixed-conducting multi-component metal oxide material having an inner side and an outer side, wherein portions of the inner side are in contact with the second side of the ceramic channeled support layer; and
  (e) a second outer support layer comprising porous mixed-conducting multi-component metal oxide material and having an inner side and an outer side, wherein the inner side is in contact with the outer side of the second dense layer.

The thickness of the wafer assembly may be between about 2 and about 8 mm as measured from the outer side of the first outer support layer to the outer side of the second outer support layer. The thickness of each of the first and second outer support layers may be between about 50 microns and about 1 mm. The thickness of each of the first and second dense layers may be between about 10 and about 500 microns. The thickness of the planar ceramic channeled support layer may be between about 100 and about 2000 microns.

An embodiment of the invention includes a planar ceramic wafer assembly comprising
  (a) a planar ceramic channeled support layer having a first side, a second side, a periphery, and a plurality of flow channels extending through the channeled support layer between the first and second sides and extending from a first region within the periphery to a second region within the periphery, wherein the flow channels place the first region and the second region in flow communication;
  (b) a first dense layer of mixed-conducting multi-component metal oxide material having an inner side and an outer side, wherein the inner side is in contact with the first side of the ceramic channeled layer;
  (c) a first outer support layer comprising porous ceramic material, the layer having an inner side, an outer side, and a periphery, wherein the inner side is in contact with the outer side of the first dense layer,
  (d) a second dense layer of mixed-conducting multi-component metal oxide material having an inner side and an outer side, wherein the inner side is in contact with the second side of the ceramic channeled layer;
  (e) a second outer support layer comprising porous ceramic material, the layer having an inner side, an outer side, and a periphery, wherein the inner side is in contact with the outer side of the second dense layer;
  (f) a first opening extending through a layered assembly defined by (a) through (e) from a first side to a second side of the layered assembly, wherein the first side is defined by the outer side of the first outer support layer and the second side is defined by the outer side of the second outer support layer, and wherein the first opening passes through the first region of the channeled support layer and is in flow communication with the plurality of flow channels in the channeled support layer; and
  (g) a second opening extending through the planar ceramic wafer assembly from the first side to the second side thereof, wherein the second opening passes through the second region of the channeled support layer and is in flow communication with the plurality of flow channels in the channeled support layer.

The first and second outer support layers may comprise dense ceramic material surrounding the first and second openings. The first and second outer support layers may comprise dense ceramic material adjacent the periphery.

Another embodiment of the invention relates to a ceramic membrane stack comprising
  (a) a plurality of planar ceramic wafer assemblies, each planar ceramic wafer assembly containing a first multi-component metal oxide and comprising
    (1) a planar ceramic channeled support layer having a first side, a second side, a periphery, and a plurality of flow channels extending through the channeled support layer between the first and second sides and extending from a first region within the periphery to a second region within the periphery, wherein the flow channels place the first region and the second region in flow communication;
    (2) a first dense layer of mixed-conducting multi-component metal oxide material having an inner side and an outer side, wherein the inner side is in contact with the first side of the ceramic channeled layer;
    (3) a first outer support layer comprising porous ceramic material, the layer having an inner side, an outer side, and a periphery, wherein the inner side is in contact with the outer side of the first dense layer, (4) a second dense layer of mixed-conducting multi-component metal oxide material having an inner side and an outer side, wherein the inner side is in contact with the second side of the ceramic channeled layer;

(5) a second outer support layer comprising porous ceramic material, the layer having an inner side, an outer side, and a periphery, wherein the inner side is in contact with the outer side of the second dense layer;

(6) a first opening extending through a layered assembly defined by (1) through (5) from a first side to a second side of the layered assembly, wherein the first side is defined by the outer side of the first outer support layer and the second side is defined by the outer side of the second outer support layer, and wherein the first opening passes through the first region of the channeled support layer and is in flow communication with the plurality of flow channels in the channeled support layer; and (7) a second opening extending through the layered assembly from the first side to the second thereof, wherein the second opening passes through the second region of the channeled support layer and is in flow communication with the plurality of flow channels in the channeled support layer; and (b) a plurality of ceramic spacers, each spacer containing a second multi-component metal oxide, wherein each spacer has a first surface, a second surface generally parallel to the first surface, a first manifold opening extending from the first surface to the second surface and a second manifold opening extending from the first surface to the second surface;

wherein the stack is formed by alternating ceramic spacers and planar ceramic wafer assemblies in an axial direction such that the first manifold openings in the spacers and the first openings in the layered assemblies are aligned to form a first manifold extending through the stack perpendicular to the planar ceramic wafer assemblies, and such that the second manifold openings in the spacers and the second openings in the layered assemblies are aligned to form a second manifold extending through the stack perpendicular to the planar ceramic wafer assemblies.

The thickness of the wafer assembly may be between about 1.5 mm and about 8 mm as measured in the axial direction from the outer side of the first outer support layer to the outer side of the second outer support layer. The distance between successive wafer assemblies in the axial direction as defined by the thickness of the spacer assembly may be between about 0.5 mm and about 5 mm.

The ceramic membrane stack may further comprise a joint material at each interface between a planar ceramic wafer assembly and a ceramic spacer, wherein the joint material comprises at least one metal oxide having at least one shared metal contained in at least one of the first multi-component metallic oxide and the second multi-component metallic oxide, and wherein the joint material has a melting point below a sintering temperature of the first multi-component metallic oxide and below a sintering temperature of the second multi-component metallic oxide.

One aspect of the invention includes a planar ceramic channeled support layer assembly comprising (a) a planar ceramic slotted support layer having a first surface, a second surface, and an outer periphery, wherein the slotted support layer includes (1) a region defined by a right parallelogram enclosing a first plurality of parallel slots passing through the support layer and oriented parallel to a first side and an opposing second side of the parallelogram, (2) a second plurality of parallel slots that extend through the support layer from the first side to the second side, are perpendicular to the first plurality of parallel slots, and are disposed between the periphery and the first side of the parallelogram, and (3) a third plurality of parallel slots that pass through the support from the first side to the second side, are perpendicular to the first plurality of parallel slots, and are disposed between the periphery and the second side of the parallelogram;

(b) a first planar ceramic flow channel layer in contact with the first surface of the planar ceramic slotted support layer, wherein the first planar ceramic flow channel layer includes a plurality of parallel flow channels that extend therethrough, and wherein the plurality of parallel flow channels are adjacent to, perpendicular to, and in fluid flow communication with the first plurality of parallel slots in the support layer;

(c) a second planar ceramic flow channel layer in contact with the second surface of the planar ceramic slotted support layer, wherein the second planar flow channel layer includes a plurality of parallel flow channels that extend therethrough, and wherein the plurality of parallel flow channels are adjacent to, perpendicular to, and in fluid flow communication with the first plurality of parallel slots in the support layer; and (d) a first and a second series of parallel slots that pass through the ceramic channeled support layer assembly formed by the first planar ceramic flow channel layer, the support layer, and the second planar ceramic flow channel layer, wherein (1) the first and second series of parallel slots are perpendicular to the plurality of parallel flow channels in the first and second planar ceramic flow channel layers, (2) the first series of parallel slots is disposed between the periphery and the first side of the parallelogram and the slots in the first series of parallel slots pass through and intersect the second plurality of parallel slots extending through the support layer, and (3) the second series of parallel slots is disposed between the periphery and the second side of the parallelogram and the slots in the second series of parallel slots pass through and intersect the third plurality of parallel slots extending through the support layer;

wherein the slots in the first and second series of parallel slots are in fluid flow communication with all slots in the first planar ceramic flow channel layer, the support layer, and the second planar ceramic flow channel layer.

The width of each slot in the first plurality of parallel slots in the planar ceramic slotted support layer may be between about 0.2 and about 2 mm and the distance between adjacent parallel slots in the first plurality of parallel slots may be between about 0.2 and about 4 mm.

A process-related embodiment of the invention includes a hydrocarbon oxidation process comprising (a) providing a planar ceramic membrane reactor assembly comprising a dense layer of mixed-conducting multi-component metal oxide material, wherein the dense layer has a first side and a second side, a support layer comprising porous mixed-conducting multi-component metal oxide material in contact with the first side of the dense layer, and a ceramic channeled support layer in contact with the second side of the dense layer;

(b) passing a heated oxygen-containing oxidant feed gas through the ceramic channeled layer and in contact with the second side of the dense layer;

(c) permeating oxygen ions through the dense layer and providing oxygen on the first side of the dense layer;

(d) contacting a heated hydrocarbon-containing feed gas with the support layer wherein the hydrocarbon-containing feed gas diffuses through the support layer; and (e) reacting the hydrocarbon-containing feed gas with the oxygen to yield a hydrocarbon oxidation product.

The hydrocarbon-containing feed gas may comprise one or more hydrocarbon compounds containing between one and six carbon atoms. The oxygen-containing oxidant feed gas may be selected from the group consisting of air, oxygen-depleted air, and combustion products containing oxygen, nitrogen, carbon dioxide, and water. The hydrocarbon oxidation product may comprise oxidized hydrocarbons, partially oxidized hydrocarbons, hydrogen, and water.

The oxygen-containing oxidant feed gas and the hydrocarbon-containing feed gas may flow cocurrently through the ceramic membrane reactor assembly. The support layer may include one or more catalysts comprising metals selected from or compounds containing metals selected from the group consisting of platinum, palladium, rhodium, ruthenium, iridium, gold, nickel, cobalt, copper, potassium and mixtures thereof.

Another embodiment of the invention relates to a method of making a green ceramic planar channeled support layer assembly comprising (a) preparing a green ceramic planar slotted support layer having a first surface, a second surface, and an outer periphery, wherein the slotted support layer includes (1) regions on the first and second surface, each region defined by a right parallelogram within the outer periphery wherein each parallelogram has a first side and an opposing second side, (2) a first plurality of parallel slots that extend through the support layer from the first side to the second side, are perpendicular to the first side of each parallelogram, and are disposed between the periphery and the first side of each parallelogram, and (3) a second plurality of parallel slots that pass through the support from the first side to the second side, are perpendicular to the second side of each parallelogram, and are disposed between the periphery and the second side of each parallelogram;

(b) preparing a first and a second green ceramic planar flow channel layer, each of which includes a plurality of parallel flow channels that extend therethrough;

(c) placing the first green ceramic planar flow channel layer in contact with the first surface of the green ceramic planar slotted support layer such that the plurality of parallel flow channels are oriented parallel to the first and second plurality of parallel slots in the support layer and are disposed within the region on the first surface defined by the right parallelogram;

(d) placing the second green ceramic planar flow channel layer in contact with the second surface of the green ceramic planar slotted support layer such that the plurality of parallel flow channels are oriented parallel to the first and second plurality of parallel slots in the support layer and are disposed within the region on the second surface defined by the right parallelogram; and (e) cutting a first and a second series of parallel slots through the green ceramic planar channeled support layer assembly formed by the first green ceramic planar flow channeled layer, the green ceramic planar slotted support layer, and the second green ceramic planar flow channeled layer, wherein (1) the first and second series of parallel slots are perpendicular to the plurality of parallel flow channels in the first and second green ceramic planar flow channel layers, (2) the first series of parallel slots is disposed between the periphery and the first side of the parallelogram and the slots in the first series of parallel slots pass through and intersect the first plurality of parallel slots extending through the support layer, (3) the second series of parallel slots is disposed between the periphery and the second side of the parallelogram and the slots in the second series of parallel slots pass through and intersect the second plurality of parallel slots extending through the support layer; and (f) cutting a third series of parallel slots through the green ceramic planar channeled support layer assembly formed by the first green ceramic planar flow channeled layer, the green ceramic planar slotted support layer, and the second green ceramic planar flow channeled layer, wherein slots in the third series of parallel slots are parallel to slots in the first and second series of parallel slots and lie between the first and second series of parallel slots;

wherein the slots in the first and second series of parallel slots are in fluid flow communication with all slots in the first green ceramic planar flow channel layer, the green ceramic planar slotted support layer, and the second green ceramic planar flow channel layer.

The ceramic multi-component metal oxide material may include one or more components, and the material may have the general composition $(La_xCa_{1-x})_yFeO_{3-\delta}$ wherein $1.0>x>0.5$, $1.1\geq y>1.0$, and $\delta$ is a number which renders the composition of matter charge neutral.

An alternative embodiment of the invention includes a planar ceramic membrane assembly comprising a dense layer of mixed-conducting multi-component metal oxide material, wherein the dense layer has a first side and a second side, a porous layer of mixed-conducting multi-component metal oxide material in contact with portions of the first side of the dense layer, a ceramic channeled support layer in contact with the second side of the dense layer, and a coating of porous mixed-conducting multi-component metal oxide material on the portions of second side of the dense layer that are not in contact with the ceramic channeled support layer.

The coating may include one or more oxygen reduction catalysts comprising metals selected from, or compounds containing metals selected from, the group consisting of platinum, palladium, ruthenium, gold, silver, bismuth, barium, vanadium, molybdenum, cerium, praseodymium, cobalt, rhodium and manganese.

Another alternative embodiment of the invention includes a planar ceramic wafer assembly comprising (a) a planar ceramic channeled support layer having a first side and a second side;

(b) a first dense layer of mixed-conducting multi-component metal oxide material having an inner side and an outer side, wherein portions of the inner side are in contact with the first side of the ceramic channeled support layer;

(c) a first outer support layer comprising porous mixed-conducting multi-component metal oxide material and having an inner side and an outer side, wherein the inner side is in contact with the outer side of the first dense layer, (d) a second dense layer of mixed-conducting multi-component metal oxide material having an inner side and an outer side, wherein portions of the inner side are in contact with the second side of the ceramic channeled layer;

(e) a second outer support layer comprising porous mixed-conducting multi-component metal oxide material and having an inner side and an outer side, wherein the inner side is in contact with the outer side of the second dense layer; and (f) a coating of porous mixed-conducting multi-component metal oxide material on the portions of the inner sides of the first and second dense layers that are not in contact with the first and second sides of the ceramic channeled support layer.

The coating may include one or more oxygen reduction catalysts comprising metals selected from, or compounds containing metals selected from, the group consisting of platinum, palladium, ruthenium, gold, silver, bismuth, barium, vanadium, molybdenum, cerium, praseodymium, cobalt, rhodium and manganese.

In another embodiment, the invention may include a method of making a planar ceramic membrane assembly comprising (a) providing a planar ceramic membrane structure comprising a dense layer of mixed-conducting multi-component metal oxide material, wherein the dense layer has a first side and a second side, a porous layer of mixed-conducting multi-component metal oxide material in contact with the first side of the dense layer, and a ceramic channeled support layer in contact with portions of the second side of the dense layer; and (b) applying a coating of porous mixed-conducting multi-component metal oxide material to portions of the surface of the dense layer that are not in contact with the channeled support layer.

A related embodiment includes a method of making a planar ceramic wafer assembly comprising (a) providing a planar ceramic wafer structure comprising
  (1) a planar ceramic channeled support layer having a first side and a second side;
  (2) a first dense layer of mixed-conducting multi-component metal oxide material having an inner side and an outer side, wherein portions of the inner side are in contact with the first side of the ceramic channeled support layer;
  (3) a first outer support layer comprising porous mixed-conducting multi-component metal oxide material and having an inner side and an outer side, wherein the inner side is in contact with the outer side of the first dense layer,
  (4) a second dense layer of mixed-conducting multi-component metal oxide material having an inner side and an outer side, wherein portions of the inner side are in contact with the second side of the ceramic channeled layer; and
  (5) a second outer support layer comprising porous mixed-conducting multi-component metal oxide material and having an inner side and an outer side, wherein the inner side is in contact with the outer side of the second dense layer;

(b) flowing a slurry of multi-component metal oxide powder suspended in a liquid through the channeled support layer and depositing a layer comprising the metal oxide powder and the liquid on interior surfaces of the channeled support layer, first dense layer, and second dense layer; and (c) evaporating the liquid from the layer to form a coating of the multi-component metal oxide powder on the interior surfaces of the channeled support layer, first dense layer, and second dense layer.

The method may further comprise partially sintering the coating by heating the planar ceramic wafer assembly to temperatures between 900° C. and 1600° C. for 0.5 to 12 hours.

BRIEF DESCRIPTION OF SEVERAL VIEWS OF THE DRAWINGS

FIG. 7A is a sectional view defined by Section 1-1 of FIGS. 6A and 6B.

FIG. 7B is a sectional view defined by Section 2-2 of FIGS. 6A and 6B.

FIG. 8A is a schematic side view of a ceramic spacer for use in embodiments of the present invention.

FIG. 8B is a schematic top view of the ceramic spacer of FIG. 8A.

DETAILED DESCRIPTION OF THE INVENTION

Figure 1:
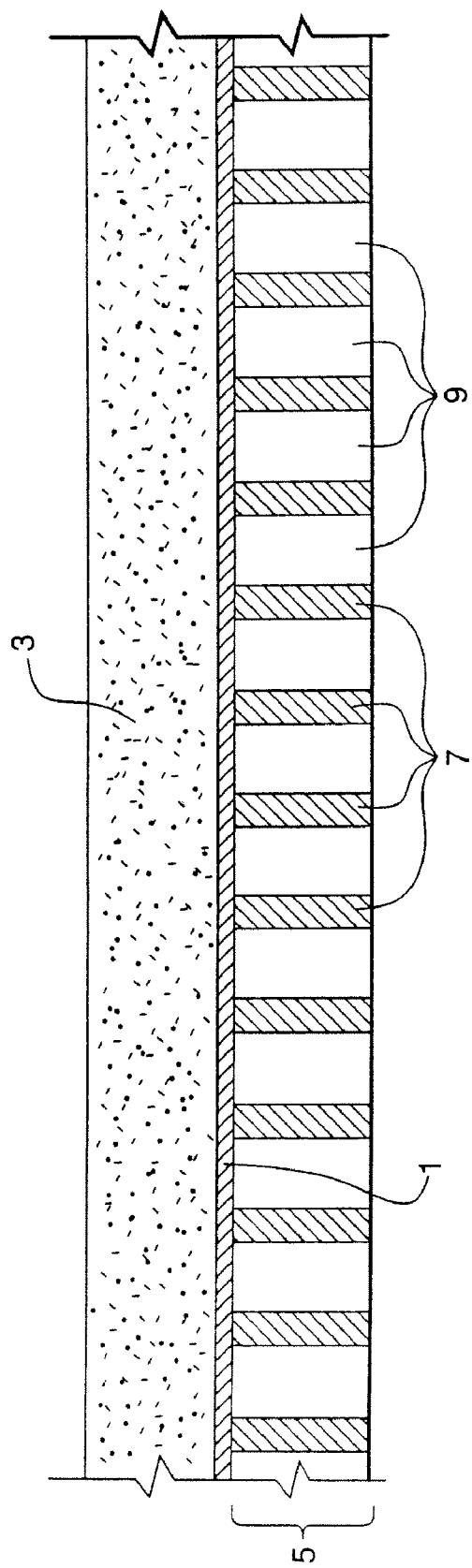
FIG. 1 is a schematic cross-sectional view of an exemplary membrane assembly in an embodiment of the present invention.

The embodiments of the present invention provide hydrocarbon partial oxidation reactor membrane designs that allows the use of a thin oxygen-permeable membrane layer operating under a large pressure differential without developing hot spots caused by localized high oxygen diffusion and high exothermic oxidation rates. This can be accomplished in part by providing significant diffusional resistance on either the low pressure or oxidant side of the membrane or on the high pressure or reactant side of the membrane. By limiting the diffusion rate of either oxygen or reactants to the surfaces of the active membrane layer, the development of hot spots on the membrane can be reduced or eliminated. A porous layer in contact with the active membrane layer can provide means to limit this diffusion rate, and the porous layer may be placed on either or both sides of the active membrane.

In embodiments of the present invention, the porous layer preferably is placed on the side of the active membrane having the highest gas phase diffusivities. In membrane reactors for the oxidation of hydrocarbons using an air feed, for example, the gas on the hydrocarbon or reactant side of the membrane exhibits higher gas phase diffusivities in porous media than the gases on the oxidant or air side of the active membrane. Thus a porous support layer preferably is placed on the reactant side of the membrane to minimize gas phase diffusional resistances.

In a membrane reactor having a high differential pressure between the reactant and oxidant sides of the active membrane, wherein the pressure is higher on the reactant side, a porous layer on the oxidant side is subjected to higher compressive stresses than would occur if the porous support were placed on the reactant side of the active membrane. This is another reason to preferably place the porous support layer on the reactant side of the active membrane. Placing the porous support on the reactant side of the membrane can control hot spots on the active membrane while also minimizing compressive stresses on the porous material.

The active dense membrane layer also should be supported on the oxidant side of the membrane. In embodiments of the present invention, this may be accomplished by placing a ceramic channeled layer or channeled support layer on the oxidant side of the membrane wherein an oxidant, for example air, flows through channels formed in the channeled support layer and directly contacts the surface of the active membrane. Thus an embodiment of the present invention includes a membrane assembly with a dense active layer having a porous support layer on one side and a channeled support layer on the other side. More particularly, one embodiment of the invention includes a planar ceramic membrane assembly comprising a dense layer of dense mixed-conducting multi-component metal oxide material, wherein the dense layer has a first side and a second side, a porous layer of mixed-conducting multi-component metal oxide material in contact with the first side of the dense layer, and a ceramic channeled layer or channeled support layer in contact with the second side of the dense layer. The mixed-conducting multi-component metal oxide material conducts both oxygen ions and electrons.

An embodiment of the invention is illustrated in FIG. 1, which is a schematic cross-sectional view (not necessarily to scale) of an exemplary membrane assembly that may be used in a hydrocarbon oxidation membrane reactor. Active membrane layer 1 is a dense layer of mixed-conducting multi-component metal oxide material and may have a thickness in the range of about 10 µm to about 500 µm. One side of the active membrane layer, which may be defined as the outer side, is in contact with and preferably bonded to porous support layer 3. The other side of the active membrane layer, which may be defined as the inner side, is in contact with and preferably bonded to channeled layer or channeled support layer 5 which comprises ceramic support ribs 7 interspersed with oxidant flow channels 9 that extend through the layer. One side of porous support layer 3, which may be defined as the inner side, is in contact with the outer side of active membrane layer 1. The other side of porous support layer 3 may be defined as the outer side.

In the present disclosure, the terms "channeled layer" and "channeled support layer" have the same meaning. By definition, a channeled layer has channels or openings extending between the two surfaces of the layer, and gas can flow freely through these channels. Typically, the channeled layer is made of dense ceramic material. The terms "porous layer" and "porous support layer" have the same meaning. The terms "support layer" and "outer support layer" have the same meaning and define a layer comprising porous ceramic material. The terms "porous layer", "porous support layer", "support layer", and "outer support layer" may be used interchangeably. The term "porous" applies to sintered or fired ceramic material or layers having through pores, i.e., pores which are interconnected such that gas can flow through the layer.

For the membrane to operate, reactants must be supplied to both surfaces of the active membrane layer. An oxygen-containing oxidant feed gas is supplied to the inner surface of the active membrane layer and a hydrocarbon-containing gas is supplied to the outer surface of the active membrane layer. The oxygen-containing oxidant feed gas may be selected from the group consisting of air, oxygen-depleted air, and combustion products containing oxygen, nitrogen, carbon dioxide, and water. The hydrocarbon-containing gas may comprise one or more hydrocarbon compounds containing between one and six carbon atoms.

The mass transport resistance to the surface of the active membrane layer can be lower when the surface is not covered with a porous support layer. Gaseous species permeating through a porous layer will encounter diffusional resistance. Gas can flow freely through the channels in a channeled layer. The hydraulic diameter of the channels in a channeled support layer are typically 2 to 3 orders of magnitude larger than the average diameter of the pores in a porous support layer. The hydraulic diameter of a channel with a rectangular cross section is defined as 4 times the cross sectional area divided by the wetted perimeter.

The term "dense" refers to a ceramic material through which, when sintered or fired, a gas cannot flow. Gas cannot flow through dense ceramic membranes made of mixed-conducting multi-component metal oxide material as long as the membranes are intact and have no cracks, holes, or imperfections which allow gas leaks. Oxygen ions can permeate dense ceramic membranes made of mixed-conducting multi-component metal oxide material. The term "green ceramic" means a material comprising ceramic powder before sintering or firing. Green ceramics additionally may comprise organic binders, organic dispersants, or organic pore formers. The term "ceramic" used alone refers to the material after sintering or firing.

Channeled support layer 5 may be made of mixed-conducting multi-component metal oxide material and may have a typical thickness in the range of about 100 µm to about 4 mm. Porous support layer 3 may have a thickness in the range of about 50 µm to about 1 mm, a porosity, defined as the volume fraction of pores, between about 10% and about 40%, and a tortuosity, between about 3 and about 10. The tortuosity is defined as the ratio of the gas phase diffusivity multiplied by the porosity divided by the measured effective diffusivity through the porous layer. A more detailed definition of tortuosity can be found in *Chemical Engineering Kinetics and Reactor Design* by Charles Hill, John Wiley and Sons, 1977, page 435.

When the membrane assembly is used in a hydrocarbon oxidation membrane reactor wherein the reactant or hydrocarbon side is at a higher pressure than the oxidant side, porous support layer 3 preferably is on the reactant side and channeled support layer 5 preferably is on the oxidant side. When the hydrocarbon oxidation membrane reactor is operated to convert a methane feed gas to synthesis gas by reaction with oxygen from an air feed gas, porous support layer 3 preferably is on the methane/synthesis gas side and channeled support layer 5 preferably is on the oxidant or air side of active membrane layer 1.

The dense material in active membrane layer 1 may comprise a mixed-conducting multi-component metal oxide compound having the general formula $(La_xCa_{1-x})_yFeO_{3-\delta}$ wherein $1.0>x>0.5$, $1.1 \geq y > 1.0$, and $\delta$ is a number which renders the composition of matter charge neutral.

Any appropriate ceramic material can be used for porous support layer 3, and may be, for example, material of the same composition as that of active membrane layer 1. Preferably, porous support layer 3 is a mixed-conducting multi-component metal oxide material. Any appropriate ceramic material can be used for the structural members of channeled support layer 5, and this ceramic material may have, for example, the same composition as that of active membrane layer 1. The material of channeled support layer preferably is a dense ceramic material. In one embodiment, active membrane layer 1, porous support layer 3, and channeled support layer 5 all may be fabricated of material having the same composition.

Active membrane layer 1 optionally may include one or more oxygen reduction catalysts on the oxidant side. The catalyst or catalysts may comprise metals selected from or compounds containing metals selected from the group consisting of platinum, palladium, ruthenium, gold, silver, bismuth, barium, vanadium, molybdenum, cerium, praseodymium, cobalt, rhodium and manganese.

Porous support layer 3 optionally may include one or more catalysts to promote hydrocarbon oxidation and other reactions that occur in the porous layer. The catalyst or catalysts may be disposed on either or both surfaces of porous support layer 3, or alternatively may be dispersed throughout the layer. The one or more catalysts may comprise metals selected from or compounds containing metals selected from the group consisting of platinum, palladium, rhodium, ruthenium, iridium, gold, nickel, cobalt, copper, potassium and mixtures thereof.

If desired for structural and/or process reasons, an additional porous layer may be disposed between active membrane layer 1 and channeled support layer 5.

Various tubular or flat plate membrane configurations may be envisioned which use the basic structural characteristics of the membrane illustrated in FIG. 1, and any of these various configurations are considered to be within the scope of embodiments of the present invention. Flat plate or planar membrane module configurations are particularly useful in the application described above for hydrocarbon oxidation reactors.

One exemplary embodiment of the present invention is a planar ceramic wafer assembly comprising a planar ceramic channeled layer having a first side and a second side, a first dense layer of mixed-conducting multi-component metal oxide material having an inner side and an outer side, wherein the inner side is in contact with the first side of the ceramic channeled layer, and a first porous ceramic layer of mixed-conducting multi-component metal oxide material having an inner side and an outer side, wherein the inner side is in contact with the outer side of the first dense layer. This wafer assembly also includes a second dense layer of mixed-conducting multi-component metal oxide material having an inner side and an outer side, wherein the inner side is in contact with the second side of the ceramic channeled layer, and a second porous layer of mixed-conducting multi-component metal oxide material having an inner side and an outer side, wherein the inner side is in contact with the outer side of the second dense layer. The wafer assembly in this embodiment thus has a central channeled layer sandwiched between two active membrane layers, and the two active membrane layers are sandwiched between two outer porous support layers.

In an alternative embodiment, a thin coating of porous mixed-conducting multi-component metal oxide material (not shown) may be applied to portions of the surface of active membrane layer 1 that face oxidant flow channels 9, i.e., those portions of the surface of active membrane layer 1 that are not in contact with support ribs 7. This coating increases the active surface area of active membrane layer 1 and promotes mass transfer at the interface between active membrane layer 1 and the oxidant or oxygen-containing gas flowing through the oxidant flow channels. This coating additionally may coat the walls of support ribs 7. The coating may comprise one or more oxygen reduction catalysts on the oxidant side. The one or more catalysts may comprise metals selected from or compounds containing metals selected from the group consisting of platinum, palladium, ruthenium, gold, silver, bismuth, barium, vanadium, molybdenum, cerium, praseodymium, cobalt, rhodium and manganese. Methods of applying this coating are described below.

The properties and characteristics of the components of the membrane assembly described above are typical of the dense layers, channeled support layers, and porous support layers of the embodiments described below.

A description of the fabrication of this exemplary embodiment of a planar ceramic wafer assembly begins with the channeled layer or channeled support layer. This exemplary channeled support layer may be fabricated from three planar components—a planar green ceramic slotted support layer and two identical planar green ceramic flow channel layers—wherein the slotted support layer is sandwiched between the flow channel layers. This is illustrated below by describing each of the planar components in turn.

Figure 2:
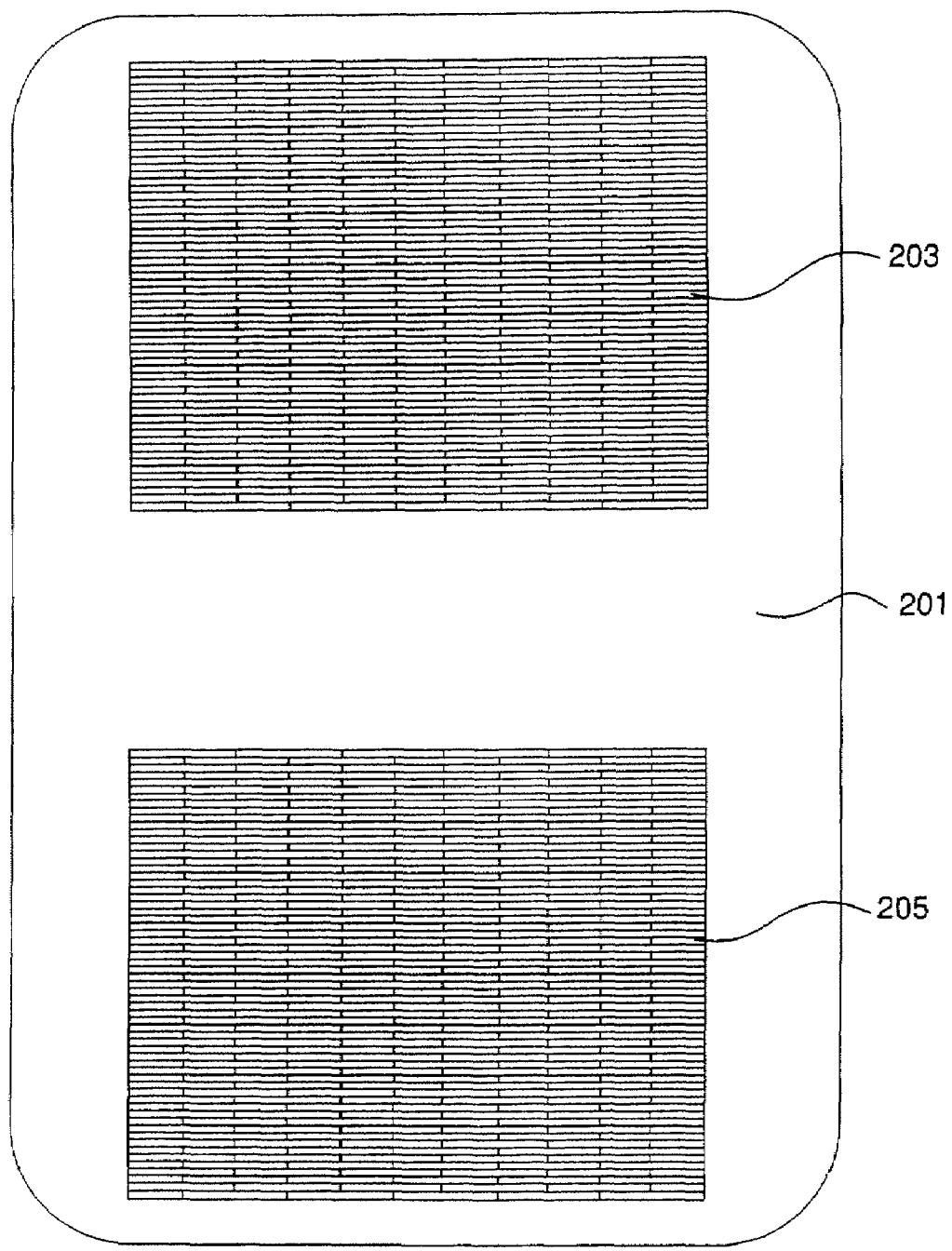
FIG. 2 is a plan view of a flow channel layer for an exemplary membrane assembly that is an embodiment of the present invention.

FIG. 2 is a plan view (not necessarily to scale) of a flow channel layer. This layer is formed from planar dense green ceramic material having a selected composition and may be square, rectangular, round, or any other appropriate shape. Flow channel layer 201 is rectangular and has two rectangular channeled regions 203 and 205 formed therein. Each channeled region has a pattern of through channels passing through the layer with a lattice of solid ribs formed between the channels. This pattern is better illustrated in FIG. 3, which is a magnified plan view (not necessarily to scale) of the channels in regions 203 and 205 of FIG. 2, showing a pattern of alternating open channels 301 formed by representative alternating supporting ribs 303 that are parallel to through channels 301 and intermediate supporting ribs 305 that are perpendicular to through channels 301.

Figure 4:
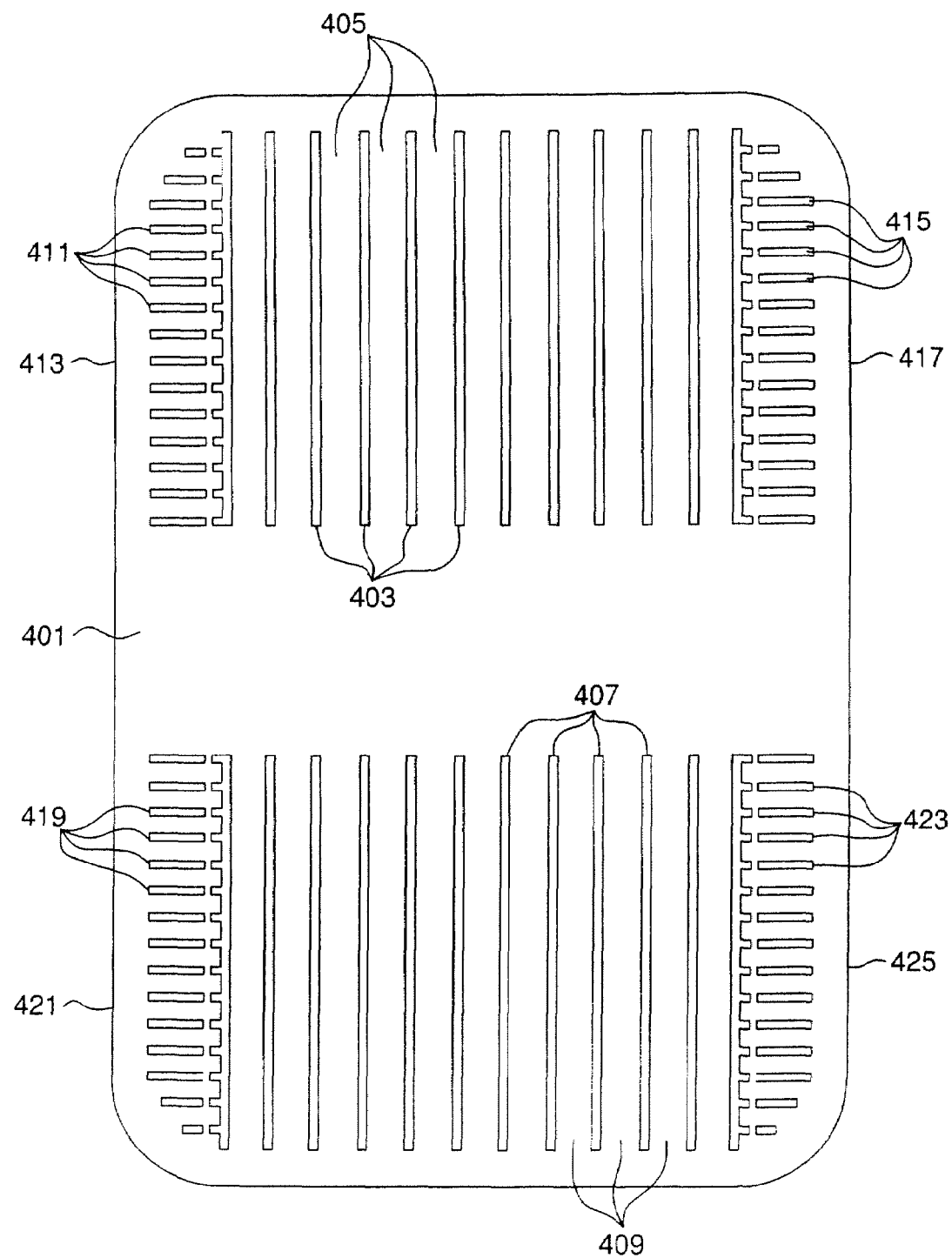
FIG. 4 is a plan view of a slotted support layer for the exemplary membrane assembly that is an embodiment of the present invention.

FIG. 4 is a plan view (not necessarily to scale) of a slotted support layer. This layer is formed from planar dense green ceramic material having a selected composition and may be square, rectangular, round, or any other appropriate shape, and typically has a similar shape and outer perimeter dimensions as the flow channel layer of FIG. 2. Slotted support layer 401 has a first generally rectangular region containing parallel slots 403 passing through the layer between support ribs 405 and a second generally rectangular region containing parallel slots 407 passing through the layer between support ribs 409. Typically, the width of support ribs 405 and 409 (or the distance between slots 403 and 407) is between about 0.2 and about 4 mm and the width of slots 403 and 407 is between about 0.2 and about 2 mm.

Slotted support layer 401 also has a plurality of parallel slots 411 passing through the layer that are perpendicular to parallel slots 403 and disposed between one side of the first generally rectangular region and outer periphery 413. Slotted support layer 401 also has a plurality of parallel slots 415 passing through the layer that are perpendicular to parallel slots 403 and disposed between an opposite side of the first generally rectangular region and outer periphery 417. Slotted support layer 401 also has a plurality of parallel slots 419 passing through the layer that are perpendicular to parallel slots 407 and disposed between one side of the second generally rectangular region and outer periphery 419. Slotted support layer 401 also has a plurality of parallel slots 423 passing through the layer that are perpendicular to parallel slots 407 and disposed between the opposite side of the second generally rectangular region and outer periphery 425.

A slotted support layer, such as slotted support layer 401, is sandwiched between two flow channel layers, such as flow channel layer 201, to form an intermediate channeled support layer. In this intermediate channeled support layer, alternating supporting ribs 303 (FIG. 3) of flow channel layer 201 are supported by support ribs 405 and 409. Intermediate supporting ribs 305 are superimposed on slots 403 and 407 and are narrower than the width of parallel slots 403 and 407 such that neighboring channels 301 in the lengthwise direction can be in flow communication, i.e., intermediate supporting ribs 305 do not block or bridge slots 403 and 407.

Figure 5:
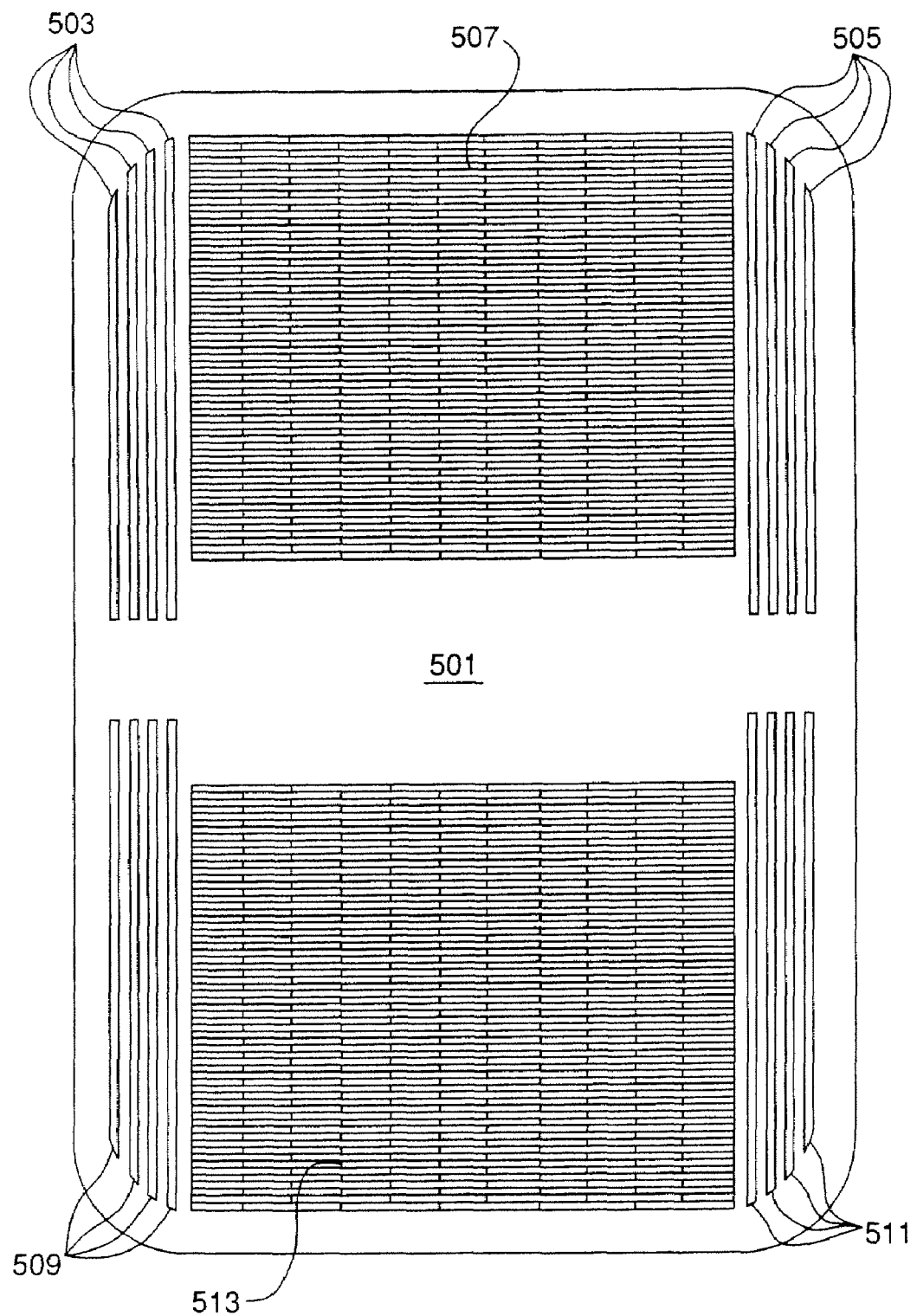
FIG. 5 is a plan view of a completed channeled support layer using the components of FIGS. 2 and 4.

The intermediate green ceramic channeled support layer formed by placing a slotted support layer between two flow channel layers is modified as illustrated in FIG. 5, which is a plan view (not necessarily to scale) of a completed channeled support layer 501. The modification comprises cutting parallel slots 503 and 505 on either side of rectangular channeled region 507, wherein these slots are parallel to slots 403 and 407 in the slotted support layer. These slots pass completely through channeled support layer 501 and therefore cut through and intersect slots 411 and 415 (FIG. 4) in the slotted support layer (not seen in FIG. 5). The modification also includes cutting parallel slots 509 and 511 on either side of rectangular channeled region 513. These slots pass completely through channeled support layer 501 and therefore cut through and intersect slots 419 and 423 (FIG. 4) in the slotted support layer (not seen in FIG. 5).

Slots 503 and 505 therefore are in flow communication with slots 403 (FIG. 4) and with the slots in rectangular channeled region 507, and also with the other rectangular channeled region (not seen in this view) on the opposite side of channeled support layer 501. In addition, slots 509 and 511 therefore are in flow communication with slots 407 (FIG. 4) and with the slots in rectangular channeled region 513, and also with the other rectangular channeled region (not seen in this view) on the opposite side of channeled support layer 501.

In an alternative method of making an intermediate green ceramic channeled support layer, slots 403 and 407 are not cut initially in layer 401 (FIG. 4). Instead, a center layer similar to layer 401 (but without slots 403 and 407) is laminated between two layers 201 (FIG. 2) and then slots similar to slots 403 and 407 are cut completely through the center layer and the two outer layers 201.

The completed green ceramic channeled support layer 501 then is modified by placing a thin layer of a green ceramic material that is a precursor of the active membrane material (described earlier as active membrane layer 1 in FIG. 1) in contact with each side of support layer 501. In one embodiment, a layer of a green ceramic material that is a precursor of the porous support layer described earlier is placed in contact with each of the thin layers of the green ceramic material that is the precursor of the active membrane material. In an alternative embodiment, a composite support layer of green ceramic material is placed in contact with each of the thin layers of the green ceramic material that is the precursor of the active membrane material.

Each of these composite support layers is formed by applying green ceramic tape that is a precursor of a dense ceramic material around the periphery of the layer and across the center region of the layer to form a frame defining two windows that may approximately match the dimensions of rectangular channeled regions 507 and 513 of the channeled support layer of FIG. 5. Green ceramic material that is a precursor of the porous support material is applied within these windows in contact with the green ceramic material that is a precursor of the active membrane material in contact with each side of support layer 501. These two embodiments yield completed assemblies that define green ceramic wafer assemblies having a central channeled layer sandwiched between two active dense membrane layers with two outer ceramic precursor support layers.

Figure 6A:
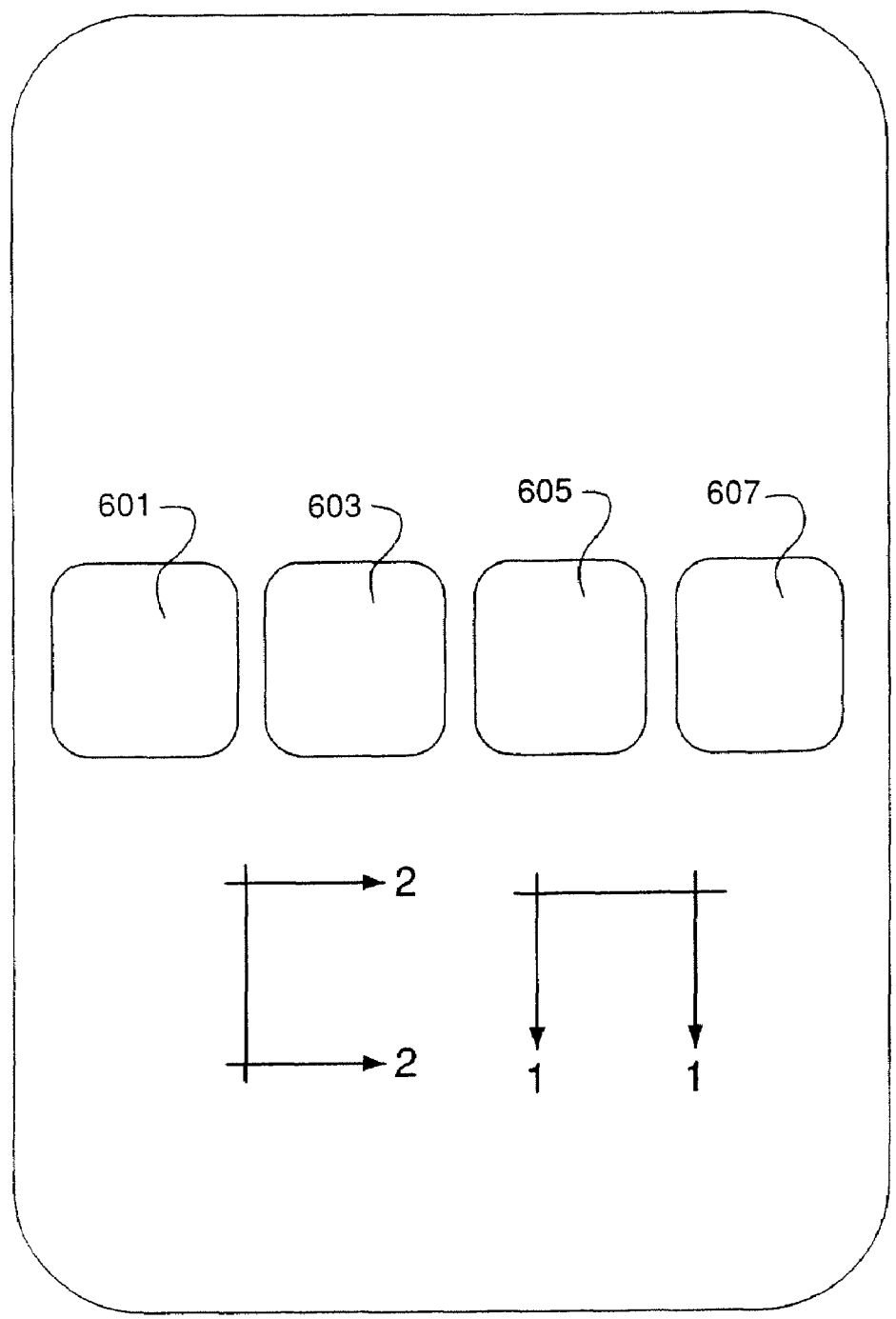
FIG. 6A is a plan view of a completed wafer assembly.

In the first of the above embodiments, the green ceramic wafer assembly is completed as shown in FIG. 6A by cutting holes, for example, four holes 601, 603, 605, and 607, completely through the center region of the wafer assembly. More than four holes may be used if desired. Hole 601 intersects and is in flow communication with slots 503 and 509 (FIG. 5). Likewise, hole 607 intersects and is in flow communication with slots 505 and 511 (FIG. 5). Holes 601 and 607 thus provide internal manifolds in flow communication with slots 403 and 407 (FIG. 4) and with the slots in rectangular channeled regions 507 and 513 (FIG. 5).

Figure 6B:
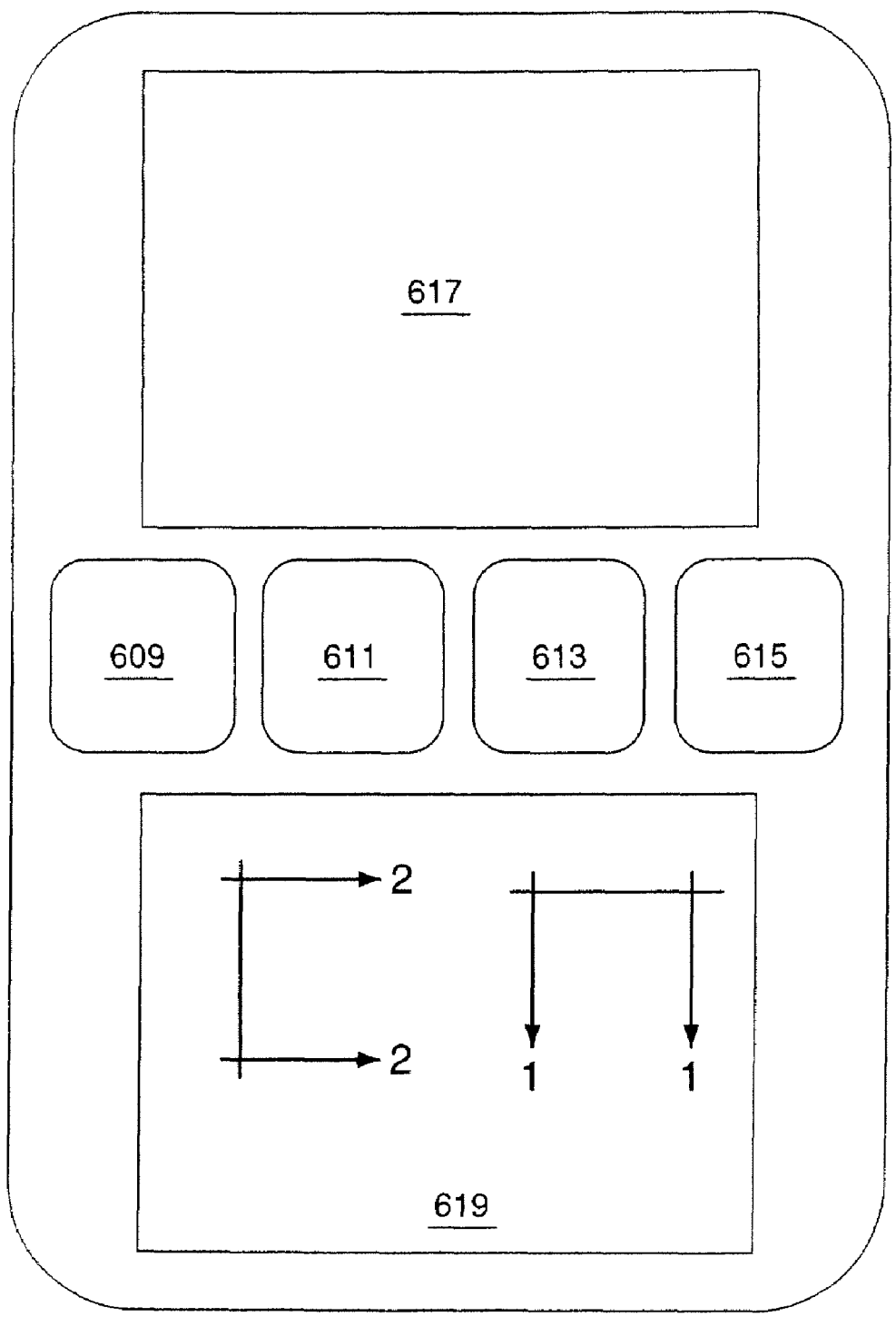
FIG. 6B is a plan view of an alternative completed wafer assembly.

In the second of the above embodiments, the green ceramic wafer assembly is completed as shown in FIG. 6B by cutting holes, for example, four holes 609, 611, 613, and 615 completely through the center region of the wafer assembly. More than four holes may be used if desired. Hole 609 intersects and is in flow communication with slots 503 and 509 (FIG. 5). Likewise, hole 615 intersects and is in flow communication with slots 505 and 511 (FIG. 5). Holes 609 and 615 thus provide internal manifolds in flow communication with slots 403 and 407 (FIG. 4) and with the slots in rectangular channeled regions 507 and 513 (FIG. 5). In this embodiment, regions 617 and 619 of the support layer contain the green ceramic material that is a precursor of the porous support material. The remaining region of the support layer, i.e., the region surrounding holes 609-615, region 617, and region 619, contains the green ceramic tape described above that is a precursor of a dense ceramic material.

These green ceramic wafer assemblies are then fired to sinter all ceramic material in the assemblies. After firing, the internal configurations of the completed wafer assemblies in FIGS. 6A and 6B allow gas to flow through hole 601 or 609, through slots 403 and 407 as well as the slots in regions 507 and 513, thereby contacting the gas with the surfaces of the two active dense membrane layers on either side of central channeled support layer 501. After contact with the two active dense membrane layers, the gas flows into hole 607 or 615. Holes 603 and 611, and holes 605 and 613, are not in direct flow communication with the internal slots and channels in channeled support layer 501, since these holes pass through the middle region of the support layer between slotted regions 507 and 513. Holes 603 and 605, or holes 611 and 613, may serve as part of a stack flow manifold as described below.

The completed wafer assemblies of FIGS. 6A and 6B may have a width between 5 and 40 cm, a length of between 5 and 40 cm, and a thickness between 1.5 mm and 8 mm.

The internal structure of the wafer assemblies described above is illustrated in FIG. 7A, which shows (not necessarily to scale) representative internal section 1-1 of FIGS. 6A and 6B. Outer support layers 701 and 703 of porous ceramic material were described earlier as porous support layer 3 of FIG. 1. Active dense membrane layers 705 and 707 were described earlier as active membrane layer 1 in FIG. 1. Slotted support layer 709 corresponds to slotted support layer 401 of FIG. 4 and shows portions 711 of parallel support ribs 405 or 409 of FIG. 4. Also shown are representative open slots 713, which correspond to parallel slots 403 or 407 of FIG. 4.

Figure 3:
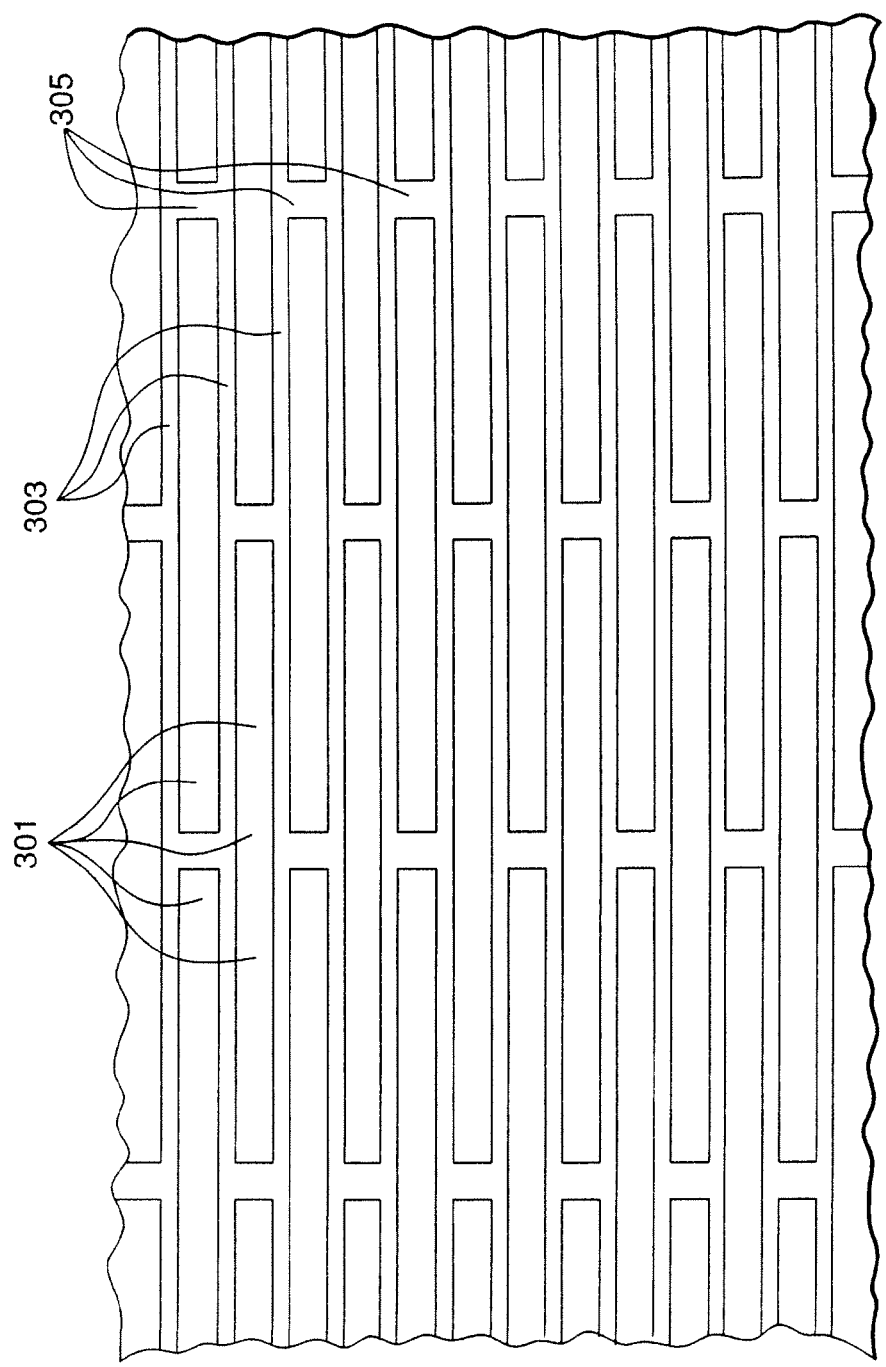
FIG. 3 is an enlarged view of a flow channel region of the flow channel layer of FIG. 2.

Flow channel layers 715 and 717 correspond to the flow channel layer of FIG. 2 and the enlarged view of FIG. 3. Representative open channels 719 correspond to open channels 301 formed by alternating supporting ribs 303 in FIG. 3. Representative intermediate supporting ribs 721 and 723 correspond to intermediate supporting ribs 305 in FIG. 3. Representative open channels 725 are representative of open channels 301 formed by alternating supporting ribs 303 in FIG. 3. Representative intermediate supporting ribs 727 and 729 correspond to intermediate supporting ribs 305 in FIG. 3. Representative open slots 713 are wider than intermediate supporting ribs 721, 723, 727, and 729, so that open channels 719 and 725 are in flow communication via open slots 713.

The internal structure of the exemplary wafer assembly described above is further illustrated in FIG. 7B, which shows (not necessarily to scale) a representative internal section 2-2 of FIGS. 6A and 6B. Outer support layers 701 and 703 and active dense layers 705 and 707 are identical to those of FIG. 7A. Section 2-2 shows a longitudinal view of slotted support layer 709, which view corresponds to longitudinal section of a portion of slot 403 or 407 of FIG. 4.

Flow channel layers 715 and 717 correspond to the flow channel layer of FIG. 2 and the enlarged view of FIG. 3. Section 2-2 shows a section across open channels 301 and alternating supporting ribs 303 in FIG. 3. Porous support layers 701 and 703, as well as dense layers 705 and 707, are also shown in FIG. 7B.

In FIGS. 7A and 7B, a channeled support layer may be defined by slotted support layer 709 and flow channel layers 715 and 717. The channeled support layer has a first side defined by the interface between the inner side of dense layer 705 and flow channel layer 715. The channeled support layer has a second side defined by the interface between the inner side of dense layer 707 and flow channel layer 717. Portions of dense layer 705 are in contact with alternating supporting ribs 303 and other portions are not in contact with these ribs. Also, portions of dense layer 707 are in contact with alternating supporting ribs 303 and other portions are not in contact with these ribs. Thus only portions of a dense layer are in actual contact with a side of a channeled support layer and the remaining portions of the dense layer are not in actual contact with the channeled support layer.

In an alternative embodiment, a thin coating of porous mixed-conducting multi-component metal oxide material (not shown) may be applied to portions of active dense membrane layers 705 and 707 that face open channels 719 and 725 (FIG. 7A) and open channels 301 (FIG. 7B). These portions are the portions of active dense membrane layers 705 and 707 that are not in contact with intermediate supporting ribs 721, 723, 727, and 729 (FIG. 7A) and alternating support ribs 303 (FIG. 7B). This coating increases the active surface area of active dense membrane layers 705 and 707 and promotes mass transfer at the interface between active dense membrane layers 705 and 707 and the oxidant or oxygen-containing gas flowing through the oxidant flow channels. The coating may comprise one or more oxygen reduction catalysts on the oxidant side. The one or more catalysts may comprise metals selected from or compounds containing metals selected from the group consisting of platinum, palladium, ruthenium, gold, silver, bismuth, barium, vanadium, molybdenum, cerium, praseodymium, cobalt, rhodium and manganese.

The coating may be applied by flowing a slurry of multi-component metal oxide powder through the channels of the wafer after the wafer has been assembled, either in the green state or after sintering. The slurry may be made by mixing multi-component metal oxide powder with a liquid such as water or an organic solvent. Dispersants optionally may be added to the slurry to stabilize the dispersion of the powder. Pore forming agents such as microcellulose or graphite may be added to the slurry to aid in the production of porosity. The slurry then is forced to flow through the wafer channels, filling the channels with the slurry. The liquid from the slurry then is evaporated from the inside of the wafer by heating the wafer. This leaves a coating of the multi-component metal oxide powder on the inside surface of the dense layer as well as the walls of the channels of the channeled support layer. Alternatively, air or another gas is blown through the channels after the slurry has filled the channels to force out excess slurry, leaving a coating of the slurry on the inside surface of the dense layer as well as the walls of the channels of the channeled support layer. The slurry then is dried by heating the wafer to remove the liquid.

The multi-component metal oxide powder then is partially sintered to bond the powder to the inside surface of the dense layer. Sintering of the coating is accomplished by first heating to remove any liquid or organics that were present in the slurry. The temperature is then increased to a level sufficient to partially sinter the powder and produce a well adhered porous coating of multi-component metal oxide to the inside surface of the dense layer. Typical conditions are 900-1600° C. for 0.5-12 hours. The porous coating may be 1 to 100 μm thick and preferably may be <50 microns thick. The porous coating may be 10-50% porous and preferably may be 25-50% porous.

The complete wafer assembly described in FIG. 4, 5, 6A or 6B, 7A, and 7B forms one of the basic repeating elements for a multi-wafer stack. The other repeating element is the ceramic spacer shown in the views of FIGS. 8A and 8B. The ceramic spacer is made of a selected ceramic material, has openings 801 and 803 separated by rib 805, and has a width similar to the width of the wafer assembly of FIGS. 6A and 6B. The ceramic material should be dense and non-porous so that gas cannot flow through the spacer walls surrounding openings 801 and 803. Opening 801 is sized to fit over holes 601 and 603 of FIG. 6A or holes 609 and 611 of FIG. 6B. Opening 803 is sized to fit over holes 605 and 607 of FIG. 6A or holes 613 and 615 of FIG. 6B. The height of the spacer (the vertical dimension in FIG. 8A) may be in the range of 0.5 mm to 5 mm.

Figure 9A:
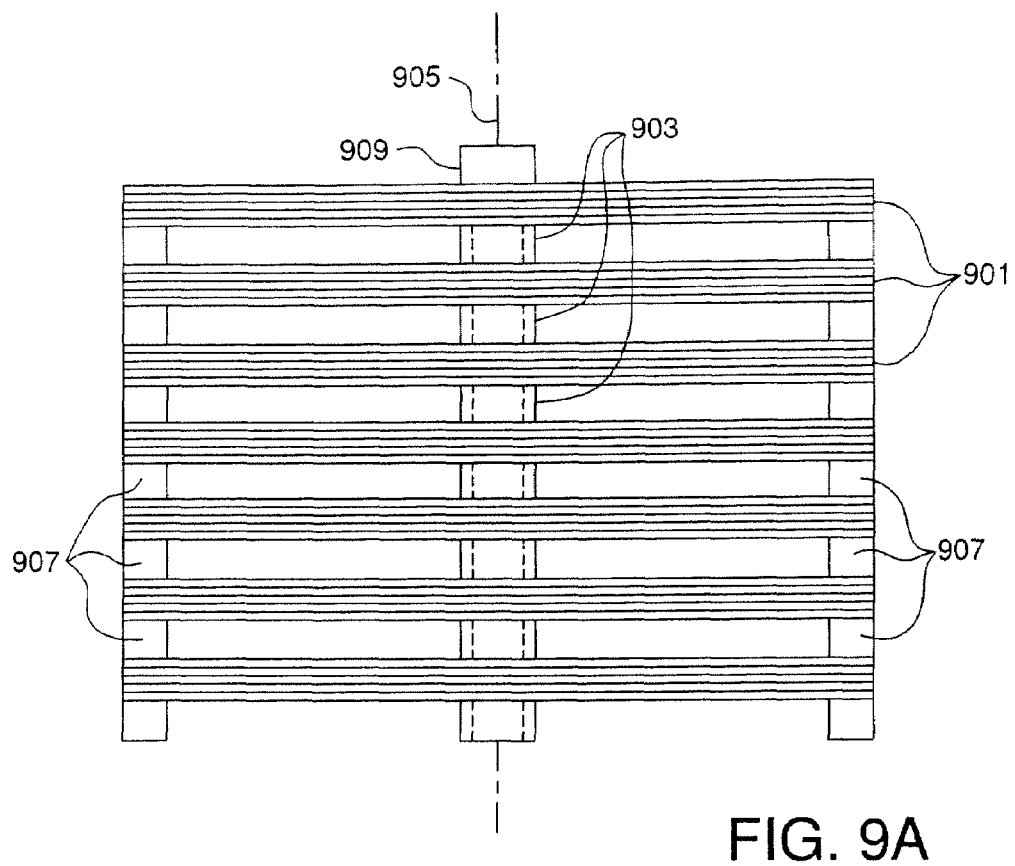
FIG. 9A is a schematic front view of an exemplary membrane stack formed by alternating wafers and spacers.
Figure 9B:
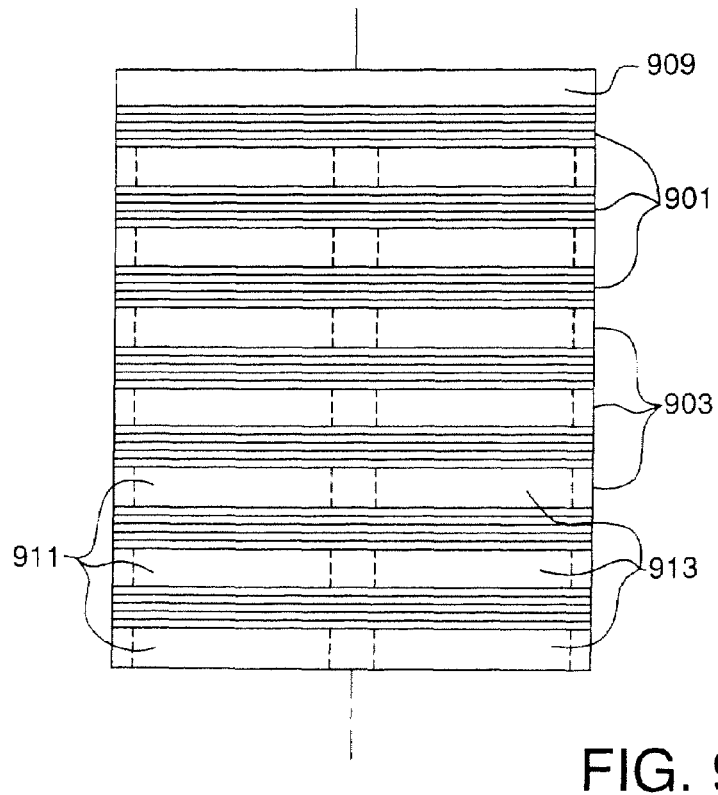
FIG. 9B is a schematic side view of the stack of FIG. 9A.

A plurality of wafer assemblies and spacers can be fabricated into a ceramic membrane stack having alternating wafers and spacers as shown in the front and side views of FIGS. 9A and 9B, respectively. This ceramic stack can be fabricated by assembling green ceramic components and firing the resulting green stack assembly, or alternatively by firing individual green ceramic components and joining the fired components with a joining compound as described below.

The views of FIGS. 9A and 9B illustrate the placement of stack components and are not to scale. FIG. 9A shows a plurality of parallel wafer assemblies 901 and spacers 903 stacked congruently and in alternating fashion along axis 905. The wafer assemblies are supported in the center of the stack by the spacers and are cantilevered out to the edges of the stack. Optionally, spacers 907 can be placed between the wafers on opposites sides of the stack as shown to provide support and reduce the bending moment on the wafers near the central spacers. These spacers may extend across the full width of the stack, i.e., extending perpendicularly into the page in FIG. 9A. Cap 909 is placed on the top wafer of the stack to close holes 601, 603, 605, and 607 (FIG. 6A) or holes 609, 611, 613, and 615 (FIG. 6B).

FIG. 9B shows a side view of the stack having wafers 901, spacers 907, and cap 909. This view corresponds to a vertical edge view of the wafer in FIGS. 6A and 6B. Openings 911 (each of which corresponds to opening 801 of the spacer in FIGS. 8A and 8B) and holes 601 and 603 (FIG. 6A) or holes 609 and 611 (FIG. 6B) form an internal manifold extending through the length of the stack. Likewise, openings 913 (each of which corresponds to opening 803 of the spacer in FIGS. 8A and 8B) and holes 605 and 607 (FIG. 6A) or holes 613 and 615 (FIG. 6B) form an internal manifold extending through the length of the stack. These two internal manifolds are in flow communication through the wafers via the internal slots and channels in the channel support layer as earlier described. A complete stack, a portion of which is shown schematically in FIGS. 9A and 9B, may contain between 1 and 200 wafers and may have a height of 2.5 mm to 2.6 m. When assembled from green ceramic stack components, the stack described above may be sintered by firing at temperatures in the range of 1000-1600° C. for 0.5 to 12 hours.

Alternatively, the stack described above may be fabricated by first assembling a plurality of individual green wafers as described above, making a plurality of green spacers as described above, and sintering these individual green ceramic wafer and spacer subcomponents at temperatures from 1000-1600° C. for 0.5 to 12 hours. The wafer subcomponents may comprise a first multi-component metallic oxide having a first crystal structure selected from the group consisting of a perovskitic structure and a fluorite structure and the spacer subcomponent may comprise a second multi-component metallic oxide having a second crystal structure identical to the first crystal structure. The first and second multi-component metallic oxide compositions may be the same. In an exemplary stack assembly, the wafer and spacer subcomponents both may have a composition defined by the formula $(La_{0.85}Ca_{0.15})_{101}FeO_3$.

Sintered wafer and spacer subcomponents then may be assembled into a stack as described above with reference to FIGS. 9A and 9B by applying at each interface between a wafer and a spacer a joint material comprising at least one metal oxide. The at least one metal oxide may comprise at least one shared metal contained in at least one of the first multi-component metallic oxide and the second multi-component metallic oxide. The joint material preferably is free of carbon, silicon, germanium, tin, lead, phosphorus and tellurium. The at least one metal oxide in the joint material preferably has a melting point below the sintering temperature of the first multi-component metallic oxide and below the sintering temperature of the second multi-component metallic oxide. The stack formed in this manner is heated to a temperature above the melting point of the at least one metal oxide in the joint material, below the sintering temperature of the first multi-component metallic oxide, and below the sintering temperature of the second multi-component metallic oxide. This yields a completed stack as described above with reference to FIGS. 9A and 9B.

In an exemplary method of making the gaskets described above, a slip was made by adding 920.2 grams of $(La_{0.9}Ca_{0.1})_{1.005}FeO_3$ powder and 9.2 grams of $Fe_2O_3$ to a one-liter high density polyethylene container containing one kilogram of spherical zirconia media, 242.1 grams of reagent grade toluene, 60.5 grams of denatured ethanol, and 4.65 grams polyvinyl butyral. The slip was put on a paint shaker for 30 minutes. Plasticizer (53.56 grams butyl benzyl phthalate) and binder (48.9 grams of polyvinyl butyral) were added to the slip and it was put back on the paint shaker for an additional hour. The slip was rolled overnight and a viscosity of 1500 mPa-s was measured using a viscometer at 25° C. The slip was then filtered, degassed, and cast on polyester to make dried tape approximately 250 μm thick. Gaskets with the appropriate shape and dimensions were sheared out of the tape and placed between the wafers and the spacers to be joined, thereby forming a stack. A pressure of 170 kPa was applied to the joints and stack, and the assembly was slowly heated to 1250° C. to remove the organics and sinter the joint compound, thereby forming a leak-tight stack.

Similar technology is disclosed in two copending applications filed on even date herewith, one entitled "Method of Joining ITM Materials Using a Partially or Fully-Transient Liquid Phase", Ser. No. 10/393,954, and the other entitled "Method of Forming a Joint", Ser. No. 10/393,564.

Figure 10:
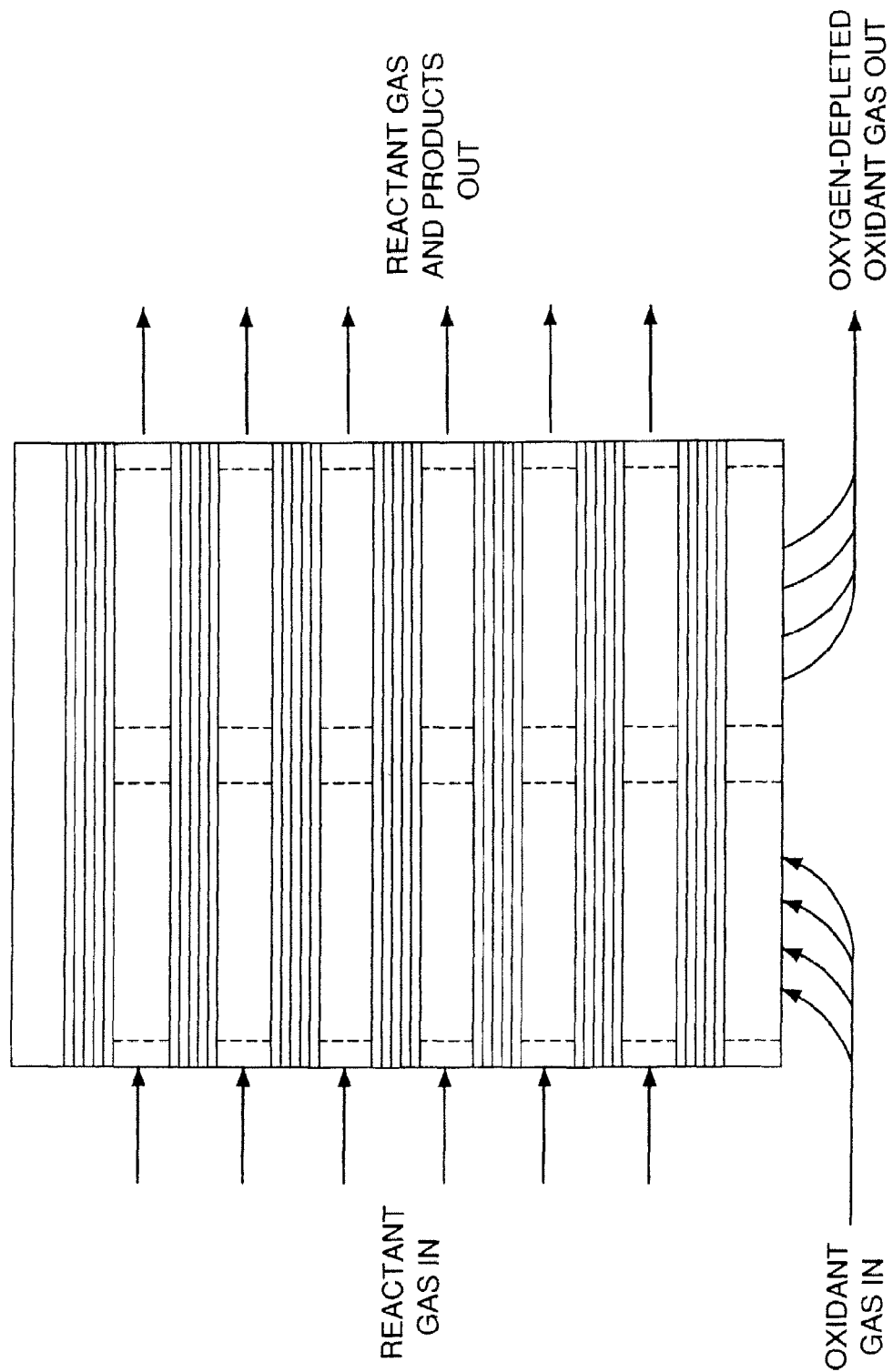
FIG. 10 illustrates the oxidant and reactant gas flows in the exemplary stack of FIG. 9B.

In an alternative embodiment, a thin coating of porous mixed-conducting multi-component metal oxide material may be applied to portions of the active dense membrane layers in the completed ceramic stack of FIGS. 9A, 9B, and 10. As described above for the wafer assemblies, this coating is applied to the portions of the active dense membrane layers which face the internal oxidant gas flow channels and which are not in contact with intermediate and alternating supporting ribs. In this embodiment, the coating may be applied to the internal regions of the completed ceramic stack including the active dense membrane layers. This coating increases the active surface area of the active dense membrane layers and promotes mass transfer at the interface between active dense membrane layers and the oxidant or oxygen-containing gas flowing through the oxidant flow channels. The coating may comprise one or more oxygen reduction catalysts on the oxidant side. The one or more catalysts may comprise metals selected from or compounds containing metals selected from the group consisting of platinum, palladium, ruthenium, gold, silver, bismuth, barium, vanadium, molybdenum, cerium, praseodymium, cobalt, rhodium and manganese.

The coating may be applied by flowing a slurry of multi-component metal oxide powder through the channels of the stack after the stack has been assembled. The slurry may be made by mixing multi-component metal oxide powder with a liquid such as water or an organic solvent. Dispersants optionally may be added to the slurry to stabilize the dispersion of the powder. Pore forming agents such as microcellulose or graphite may be added to the slurry to aid in the production of porosity. The slurry is then forced to flow through the channels in the stack, filling the channels with the slurry. The liquid from the slurry then is drained and the residual slurry inside the stack is dried by heating the stack. This leaves a coating of the multi-component metal oxide powder on all of the inside surfaces of the stack including the exposed dense layers. Alternatively, air or another gas may be blown through the channels after the slurry has filled the channels to force out excess slurry, leaving a coating of the slurry on the inside surface of the dense layer as well as the walls of the channels of the channeled support layers in the stack. The slurry then may be dried by heating the stack to remove the liquid.

The multi-component metal oxide powder then is partially sintered to bond the powder to the inside surface of the dense layer. Sintering of the coating is accomplished by first heating the stack to remove any liquid or organics that were present in the slurry. The temperature is then increased to a level sufficient to partially sinter the powder and produce a well-adhered porous coating of multi-component metal oxide on the inside surfaces of the stack including the exposed surface portions of the dense active layers. Typical conditions are 900-1600° C. for 0.5-12 hours.

A plurality of completed ceramic stacks can be operated at temperatures in the range of 650 to 1100° C. to convert a reactant hydrocarbon-containing feed gas and an oxygen-containing oxidant feed gas into a hydrocarbon oxidation product and unreacted feed gas. The hydrocarbon-containing feed gas may comprise one or more hydrocarbon compounds containing between one and six carbon atoms. The oxygen-containing oxidant feed gas may comprise air, oxygen-depleted air, or combustion products containing oxygen, nitrogen, carbon dioxide, and water. The hydrocarbon oxidation product may comprise oxidized hydrocarbons, partially oxidized hydrocarbons, hydrogen, and/or water. In one exemplary application, the hydrocarbon-containing feed gas is natural gas, the oxidant feed gas is a combustion product containing oxygen, nitrogen, carbon dioxide, and water, and the hydrocarbon oxidation product is synthesis gas containing hydrogen, carbon monoxide, carbon dioxide, and water.

The gas flows in an operating stack are illustrated in FIG. 10. Reactant gas containing hydrocarbon feed components flows into the stack and flows over the outer porous support layers of each wafer. Reactant gas and products exit the opposite side of the stack as shown. Oxidant gas enters at the bottom of the stack and flows upward through the first internal manifold, through the channeled support layer in each wafer, and downward through the second internal manifold. Oxygen-depleted oxidant gas leaves the stack as shown. The oxidant and reactant gases thus flow through the stack cocurrently.

While the planar ceramic membrane components and stack described above have a rectangular configuration and each wafer has four active membrane areas, other features and configurations can be envisioned that would utilize the principles described above and would be included in embodiments of the present invention. Wafers may be square, round, or any other desired shape, and may have more than four or less than four active membrane areas. Other configurations of the channels in the channeled support layer can be envisioned and would be included in embodiments of the present invention. Other internal manifold configurations are possible within the scope of the invention and would depend on the wafer shape and number of active regions in each wafer. For example, the number and orientation of the slots and channels in the channeled support layer as described above also may be varied to change the structural and flow characteristics of the layer, and these variations would be considered within embodiments of the present invention.

The invention claimed is:
1. A hydrocarbon oxidation process comprising
   (a) providing a planar ceramic membrane reactor assembly comprising a dense layer of mixed-conducting multi-component metal oxide material, wherein the dense layer has a first side and a second side, a support layer comprising porous mixed-conducting multi-component metal oxide material in contact with the first side of the dense layer, and a ceramic channeled support layer in contact with the second side of the dense layer;
   (b) passing a heated oxygen-containing oxidant feed gas through the ceramic channeled layer and in contact with the second side of the dense layer;
   (c) permeating oxygen ions through the dense layer and providing oxygen on the first side of the dense layer;
   (d) contacting a heated hydrocarbon-containing feed gas with the support layer wherein the hydrocarbon-containing feed gas diffuses through the support layer; and
   (e) reacting the hydrocarbon-containing feed gas with the oxygen to yield a hydrocarbon oxidation product.

2. The hydrocarbon oxidation process of claim 1 wherein the hydrocarbon-containing feed gas comprises one or more hydrocarbon compounds containing between one and six carbon atoms.

3. The hydrocarbon oxidation process of claim 2 wherein the oxygen-containing oxidant feed gas is selected from the group consisting of air, oxygen-depleted air, and combustion products containing oxygen, nitrogen, carbon dioxide, and water.

4. The hydrocarbon oxidation process of claim 2 wherein the hydrocarbon oxidation product comprises oxidized hydrocarbons, partially oxidized hydrocarbons, hydrogen, and water.

5. The hydrocarbon oxidation process of claim 2 wherein the oxygen-containing oxidant feed gas and the hydrocarbon-containing feed gas flow cocurrently through the ceramic membrane reactor assembly.

6. The hydrocarbon oxidation process of claim 2 wherein the support layer comprises one or more catalysts comprising metals selected from or compounds containing metals selected from the group consisting of platinum, palladium, rhodium, ruthenium, iridium, gold, nickel, cobalt, copper, potassium and mixtures thereof.

* * * * *